US008922986B2

(12) United States Patent
Garrett

(10) Patent No.: US 8,922,986 B2
(45) Date of Patent: Dec. 30, 2014

(54) DATA RECORDER

(75) Inventor: Darin S. Garrett, Delaware, OH (US)

(73) Assignee: Honda Motor Co., Ltd., Tokyo (JP)

( * ) Notice: Subject to any disclaimer, the term of this patent is extended or adjusted under 35 U.S.C. 154(b) by 107 days.

(21) Appl. No.: 13/118,688

(22) Filed: May 31, 2011

(65) Prior Publication Data

US 2012/0307442 A1   Dec. 6, 2012

(51) Int. Cl.
G06F 1/16 (2006.01)
H01R 43/00 (2006.01)
G01P 1/12 (2006.01)
G07C 5/08 (2006.01)
G07C 7/00 (2006.01)
G01D 11/24 (2006.01)

(52) U.S. Cl.
CPC .............. *G01P 1/122* (2013.01); *G01P 1/127* (2013.01); *G07C 5/085* (2013.01); *G07C 7/00* (2013.01); *G01D 11/245* (2013.01)
USPC ................ 361/679.31; 361/679.01; 174/524; 174/544

(58) Field of Classification Search
USPC ........... 361/679.31, 679.01; 29/825; 174/524, 174/544
See application file for complete search history.

(56) References Cited

U.S. PATENT DOCUMENTS

| 4,694,119 | A | 9/1987 | Groenewegen |
| 4,944,401 | A * | 7/1990 | Groenewegen ............... 206/521 |
| 5,392,197 | A | 2/1995 | Cuntz |
| 5,438,162 | A | 8/1995 | Thompson et al. |
| 5,446,659 | A | 8/1995 | Yamawaki |
| 5,708,565 | A | 1/1998 | Fairbanks |
| 5,999,406 | A | 12/1999 | McKain et al. |
| D470,450 | S | 2/2003 | Olzak |
| 6,545,217 | B2 * | 4/2003 | Sato ................................ 174/50 |
| 6,771,501 | B2 | 8/2004 | Coleman |
| 7,154,041 | B2 * | 12/2006 | Payne et al. ..................... 174/67 |
| 7,225,537 | B2 | 6/2007 | Reed |
| 7,875,812 | B2 * | 1/2011 | Steffler ........................ 174/541 |
| 2003/0000720 | A1 * | 1/2003 | Sato ................................ 174/50 |
| 2010/0025101 | A1 | 2/2010 | Steffler |
| 2010/0182757 | A1 * | 7/2010 | Hirose ......................... 361/752 |

* cited by examiner

Primary Examiner — Robert J Hoffberg
Assistant Examiner — Mukund G Patel
(74) Attorney, Agent, or Firm — Fay Sharpe LLP

(57) ABSTRACT

An electronic data recorder including an electronic data storage device disposed within an enclosure having a main housing and a cover adapted to engage a base region of the housing. The main housing forms a cavity housing the electronic data storage device. A mounting wall extending from the main housing and including an attachment foot for attachment to a vehicle wherein an impact during a vehicle crash preferentially fractures one or both the mounting wall and attachment foot as opposed to the main housing.

21 Claims, 3 Drawing Sheets

DATA RECORDER

BACKGROUND

The present disclosure relates to a electronic data recorder mounted on a vehicle, such as an automotive vehicle. The recorder can store at least acceleration data of the vehicle prior to, during, and after a traffic accident.

As an example of representative apparatus for storing data at a traffic accident occurrence time, a flight data recorder mounted on an aircraft is well known. The flight recorder for an aircraft receives and records data such as the speed and acceleration of the aircraft through wires from hydraulic cylinders, the speed indicator and other sensors, while the aircraft is flying. However, because an aircraft flight recorder is a very large scale apparatus, it is not practical to apply such a system to automotive vehicles because of the complex mounting requirements, cost, etc.

Nonetheless, in order to investigate the cause of an automotive accident, it is advantageous to know the condition, or state of an automotive vehicle at the time a traffic accident has occurred involving the vehicle. In a traffic accident involving the vehicle, it is advantageous to analyze data, such as, acceleration, angular velocity, etc., at the accident occurrence time, in order to look into the cause of the accident. This information is most readily stored in an electronic condition.

Unfortunately, most electronic data recorders are susceptible to damage from environmental factors. This is particularly true for an electronic data recorder that has experienced accident conditions. The present disclosure is focused upon a suitable enclosure to protect an electronic data storage device and maintain its environmental isolation, and therefore its integrity, both before and after a crash.

BRIEF DESCRIPTION

Various details of the present disclosure are hereinafter summarized to provide a basic understanding. This summary is not an extensive overview of the disclosure, and is intended neither to identify certain elements of the disclosure, nor to delineate the scope thereof. Rather, the primary purpose of this summary is to present some concepts of the disclosure in a simplified form prior to the more detailed description that is presented hereinafter.

According to a first embodiment, an automotive vehicle including an electronic data storage device and an enclosure for protecting the device is provided. The enclosure comprises a first wall, a sidewall engaging the first wall and in cooperation with the first wall forming a cavity that receives the electronic storage data device. A cover is configured to matingly engage the sidewall and seal one side of the cavity. A mounting wall extends from a first end of the sidewall and is juxtaposed relative to the sidewall with a gap being formed between the sidewall and the mounting wall. The mounting wall includes at least two feet adapted to engage the vehicle which are located distally to a point of engagement with the sidewall.

According to a second embodiment, a method for enclosing and protecting an electronic data storage device is provided. The method includes the steps of providing an enclosure comprised of a main housing and a cover adapted to engage a base region of the housing. The main housing forms a cavity. A mounting wall extends from the main housing remote from the base region. The mounting wall includes at least one foot adapted for attachment to a surface. The electronic data storage device is located within the cavity and the cover is secured to the main housing. The enclosure is then secured to a surface via the at least one foot, wherein an impact force on the enclosure preferentially fractures one or both of the mounting wall and the foot as opposed to the main housing.

According to a third embodiment, an electronic data recorder is provided. The electronic data recorder includes an electronic data storage device disposed in an enclosure comprised of a housing having a top wall and a sidewall depending from an edge of the top wall, the top wall and the sidewall form a cavity configured to receive the electronic data storage device. The housing further includes a mounting wall having a first portion extending coplanar outwardly to the top wall and a second portion extending downwardly from the first portion at least substantially parallel to the sidewall. The second portion extends below the sidewall and includes a foot oriented and at least generally perpendicular to the second portion. A cover mates with the housing and seals the cavity.

BRIEF DESCRIPTION OF THE DRAWINGS

The following description and drawings set forth certain illustrative implementations of the disclosure in detail, which are indicative of several exemplary ways in which the various principles of the disclosure may be carried out. The illustrated examples, however, are not exhaustive of the many possible embodiments of the disclosure. Other objects, advantages and novel features of the disclosure will be set forth in the following detailed description of the disclosure when considered in conjunction with the drawings, in which.

DETAILED DESCRIPTION

Figure 1:
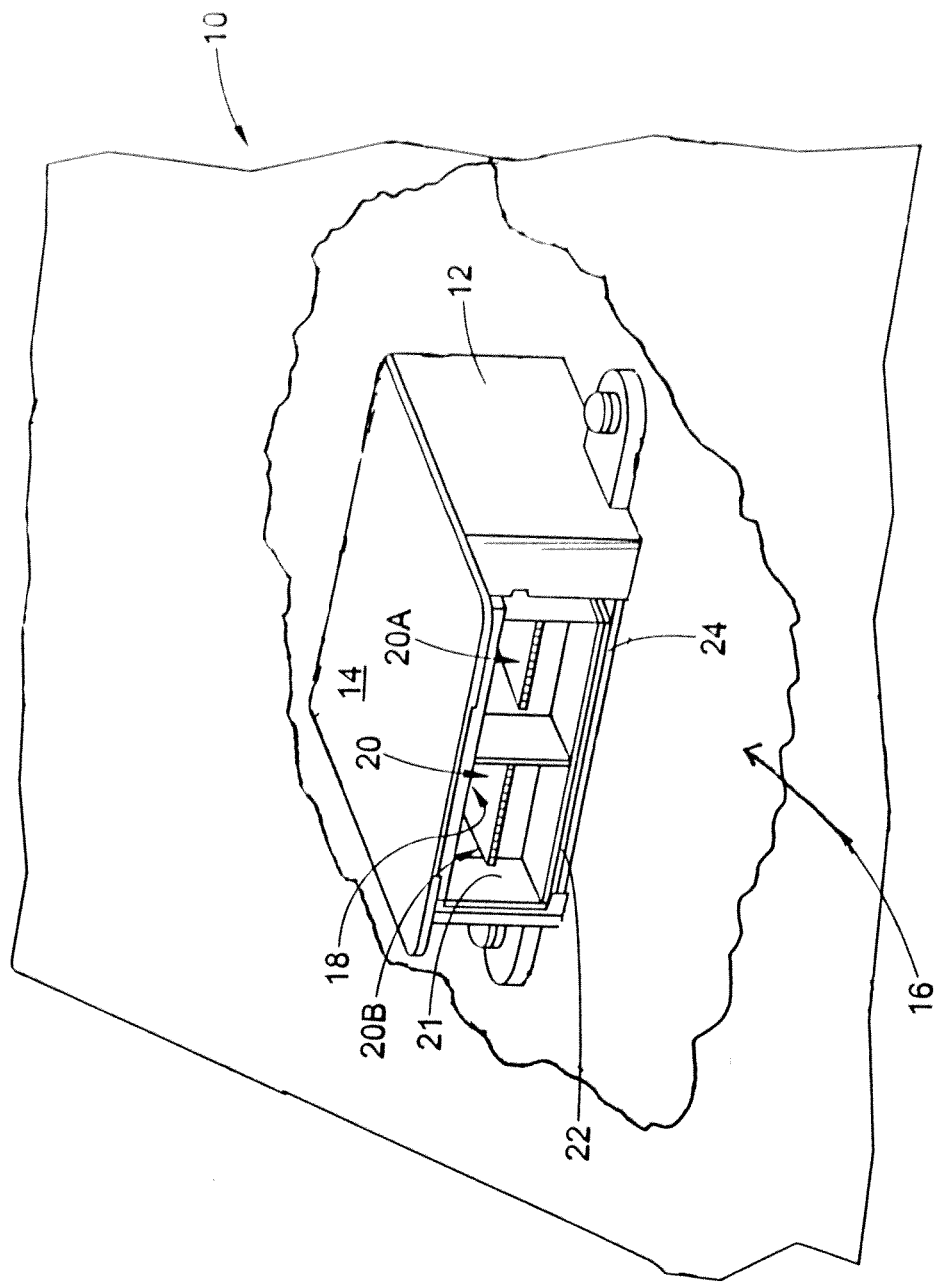
FIG. 1 is a perspective view showing an electronic data storage device mounted on an automotive vehicle.

With reference to FIG. 1, the cable area 10 of an automotive vehicle is shown including an electronic data recorder 12. The electronic data recorder 12 includes a main housing 14 mounted to the vehicle floor 16. The vehicle floor underlying a passenger seat is one suitable location. Of course, the electronic data recorder 12 can be located in various locations within the automotive vehicle. Main housing 14 defines a cavity 18 within which a connector module 20 having ports 20A and 20B is disposed. Connector module 20 receives the connector of a wiring harness (not shown) which is in electrical communication with the various sensors and other data origination devices being recorded. The wiring harness connector can be shaped and sized and optionally gasketed to form a water-tight seal with the walls 21 of connector module 20.

Connector module 20 resides upon and in electrical communication a with printed circuit board (PCB) 22 hosting a data recordation means such as an electronic data storage device, which in this case can be a semiconductor memory or a magnetic recorder or the like. As an alternative to a PCB, a conductive foil including semiconductor or magnetic storage elements could be employed. PCB 22 is retained by a cover 24.

The electronic data storage device typically can measure multiple information sources. However, acceleration and angular velocity are two of the most important.

Generally, when a vehicle is engaged in a traffic accident, it is quickly braked or, without quick braking, it rapidly decelerates when it crashes against or collides with something, or something collides with it from behind. Therefore, if the acceleration and angular velocity of the vehicle have been recorded, it is possible to know with their rapid changes when the traffic accident occurred. The electronic data storage device records acceleration data and, possibly, angular velocity data of a vehicle during a predetermined time period before and after an accident occurrence time.

The acceleration data show the speed changes of the vehicle at the accident occurrence time, and one can know from the data the magnitude of the shock of collision or crash, for example. The acceleration data is measured by an acceleration measurement means, for at least the traveling direction of a vehicle and, if necessary, the other directions than the traveling direction in the three-dimensional space. The measurement is carried out, at least substantially, constantly while the vehicle is running. As the acceleration measurement means, acceleration sensors of various types may be used, such as the strain gage type, capacitance type, piezoelectric type and differential transformer type. The acceleration measured by the acceleration measurement means is output as acceleration data to the electronic data storage device.

The angular velocity data show the changes in direction or position of the vehicle at the accident occurrence time, and one can know from the data how the direction of the vehicle has changed at the accident occurrence time. The angular velocity data are measured by the angular velocity measurement means, on the angular velocity about at least one direction in the three-dimensional space and, if necessary, on the angular velocity about the other directions. This measurement is also carried out, at least substantially, constantly while the vehicle is running. As the angular velocity measurement means, various commercial angular velocity sensors may be used. The angular velocity measured by the angular velocity measurement means are output as angular velocity data.

The acceleration data output from the acceleration measurement means and the angular velocity data output from the angular velocity measurement means are stored by the electronic data storage device.

In the electronic data storage device storing the acceleration data and, optionally, the angular velocity data before and after a traffic accident occurrence time, the storage means constantly stores the acceleration data and angular velocity data. This recording is carried out endlessly; accordingly, new data replace old data in order at regular intervals. Driving time data is preferably retained to facilitate recreation of a driving pattern prior to a crash. For example, in a frontal or side air bag deployment crash, the electronic data storage device will capture and record the deployment data for up to two events. The memory for each event can be locked to prevent future overwriting of the data. Specific Department of Transportation guidelines can be found at 49 CFR Part 563.

When a predetermined value has been exceeded by the acceleration data obtained by the acceleration measurement means or the angular velocity data obtained by the angular velocity measurement means, it can be assumed that an accident has occurred and the acceleration data and angular velocity data are stopped from being stored in the electronic data recorder. Moreover, the data recorded at the time of the incident is retained and not overwritten.

A traffic accident reproduction system can analyze the acceleration and angular velocity of the vehicle taken out of the electronic data recorder and predict the details of the traffic accident. A traffic accident reproduction system may be constructed to visually reproduce on, for example, a display screen the speed and direction of the vehicle which has encountered the accident, according to the acceleration and, if available, the angular velocity. This allows a cause to be predicted.

The data stored on the electronic data storage device should be retrievable for at least 10 days following a crash. This is set forth in FMVSS EDR Regulations (208, 214). In this regard, it is highly desirable to provide a housing for the electronic data storage device that remains structurally intact during an impact. In this regard, the phrase "structurally intact" is intended to mean that stored data is not compromised.

Figure 2:
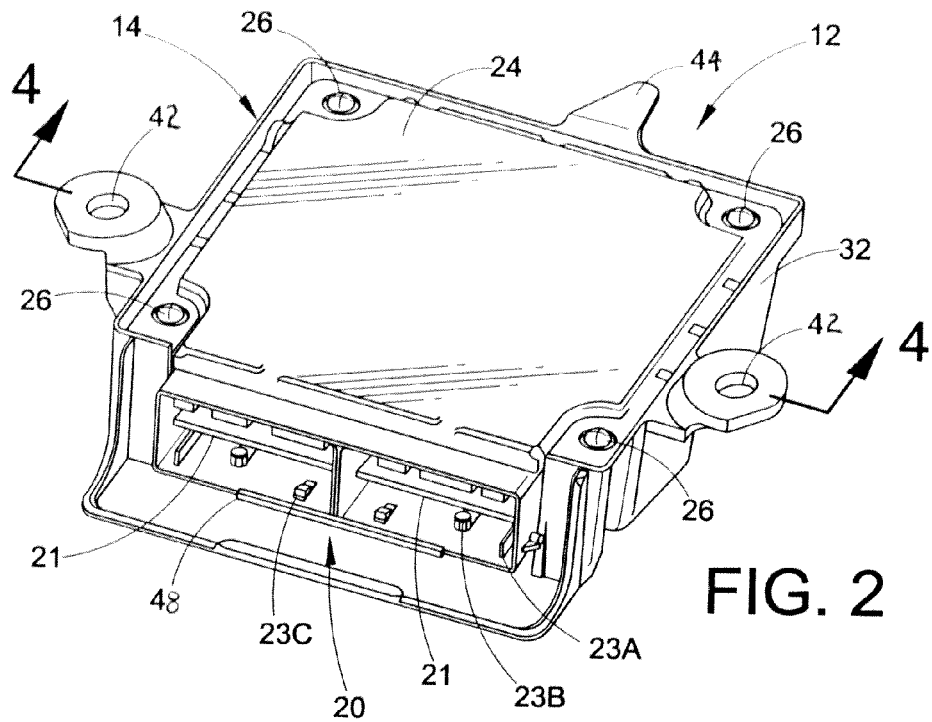
FIG. 2 is a bottom perspective view of the electronic data storage device of FIG. 1.
Figure 3:
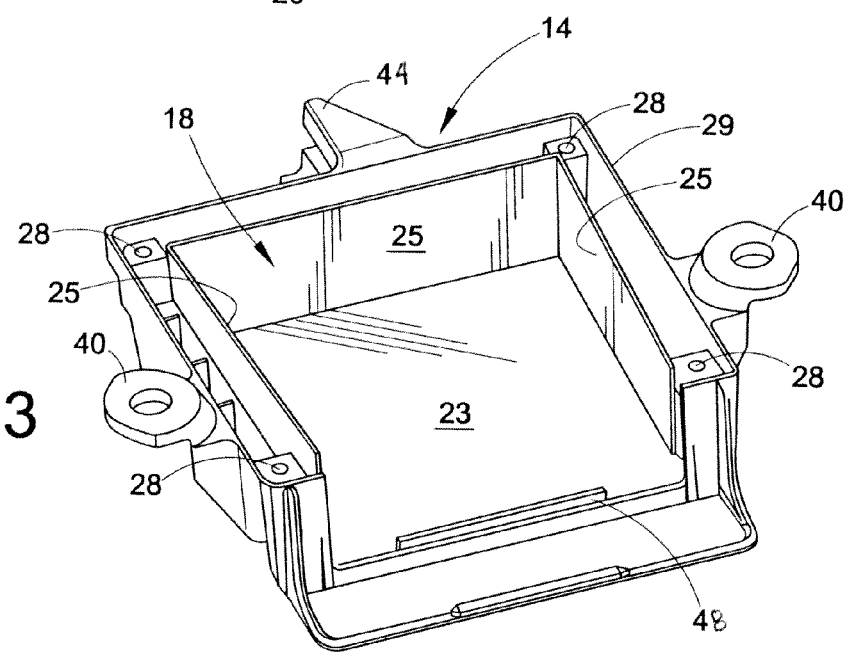
FIG. 3 is a bottom perspective view showing the device of FIG. 2 with the cover, PCB, and connector module removed.
Figure 4:
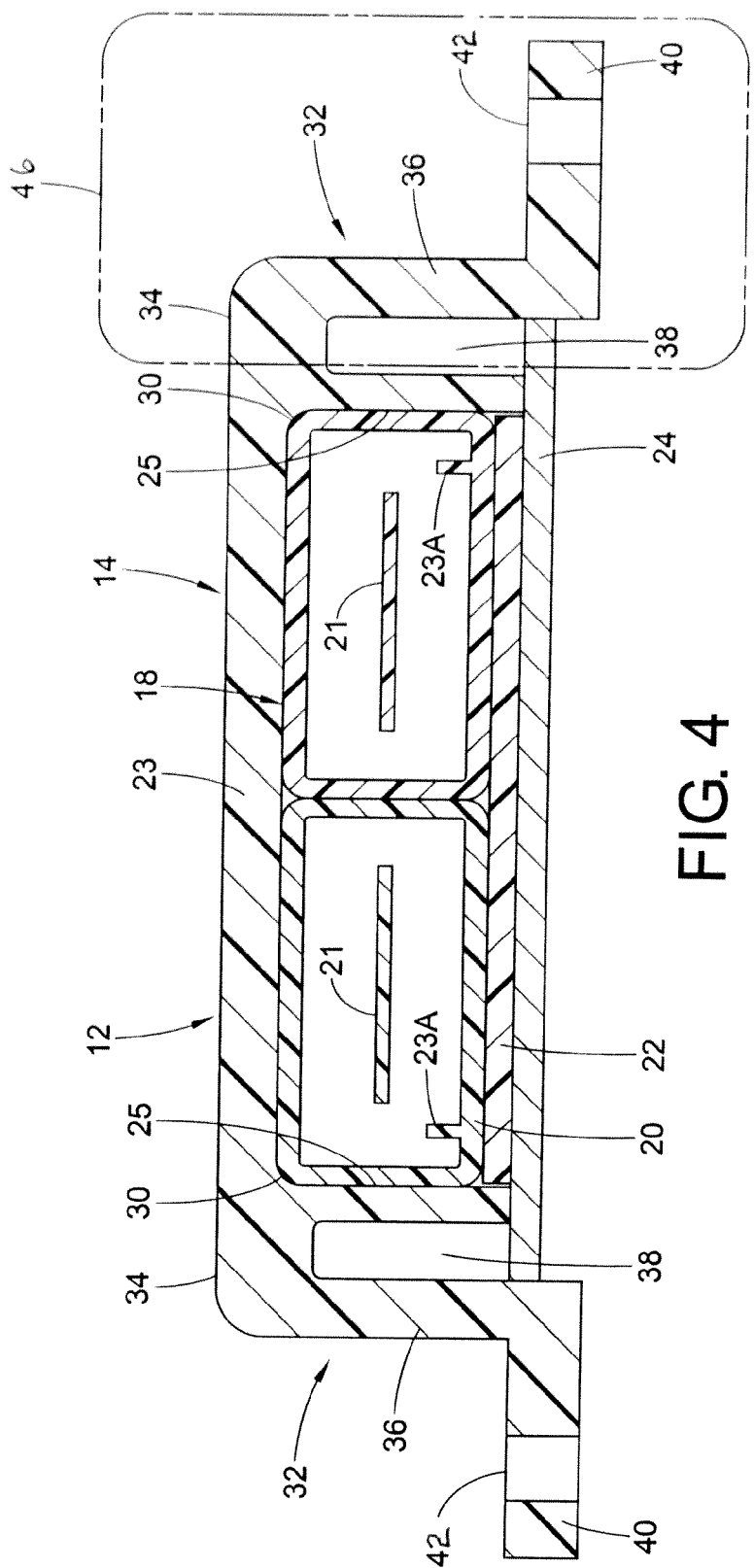
FIG. 4 is an upright sectional view of FIG. 2 taken along line 4-4.

With reference to FIGS. 2-4, the electronic data recorder 12 includes a housing 14 formed of an upper wall 23 and a sidewall 25 forming a cavity 18. Connector module 20 resides within cavity 18. Connector module 20 includes connection cards 21 and alignment/retention elements 23A, B and C to facilitate a secure and accurate mating between the connector module 20 and the wiring harness connector.

PCB 22 resides within cavity 18 and is retained therein by the cover 24. Cover 24 can be secured to the housing 14 via any means known in the art including threadedly, adhesively, or by a retaining means including screws, clips, etc. Screws 26 are shown in FIG. 2, which are received in bored posts 28 (see FIG. 3) which can be integrally cast or molded components of the housing 14. As shown, cover 24 extends past sidewall 25 and mates with a cooperatively shaped flange 29 forming an edge of the mounting wall 32. It is also feasible for the cover to terminate adjacent an overlapping position with sidewall 25. In addition, if cover 24 extends past sidewall 25, it could be directly connected laterally via adhesive, thread or screws, as examples, to mounting wall 32.

Referring specifically to FIG. 4, outer mounting wall 32 extends from an edge 30 of upper wall 23 in a first radial dimension 34 and a second overlapping parallel dimension 36. In this manner, a gap 38 is formed between sidewall 25 and mounting wall 32. Accordingly, if electronic data recorder 12 absorbs impact during an automotive vehicle accident, there is a preferential breaking of mounting wall 32 as opposed to sidewall 25. In this manner, an environmental barrier is retained around the electronic data storage device (PCB) 22 even subsequent to an accident.

Mounting wall 32 is integrally formed to include a plurality of feet 40 which are utilized to form a mating surface with the location on the automotive vehicle to which the electronic data recorder 12 is being secured. Moreover, feet 40 include passages 42 suited for accommodating a screw or bolt. While two feet 40 and a mounting tab 44 are depicted, any number and arrangement is feasible. As shown, mounting wall 32 and/or feet 40, extend beyond the sidewall 25 and cover 24, such that there is a preferential breaking of feet 40 if electronic data recorder 12 is impacted during a traffic accident.

It is noted that mounting wall 32 is not necessarily a contiguous body. Rather, it is feasible that mounting wall 32 is discontinuous in areas between feet and mounting tabs.

Moreover, in accord with the design, impact upon the electronic data recorder 12 has been found to provide a preferential fracture zone 46 such that the upper wall 23, and sidewall 25 retaining their physical integrity. Electronic data storage device (e.g. PCB or electronics deposited on foil) remains secured and protected within cavity 18. The housing 14 is most typically a die cast body comprised of an alloy including iron and at least one of zinc, aluminum, magnesium, copper, lead, tin and mixtures thereof.

To assemble, the electronic data recorder 12 can have connector module 20 positioned within cavity 18, with a retaining tab 48 overlapping the extending lip of the connector module 20. Thereafter, PCB 22 can be mounted to the connector module 20, wherein suitable pre-arranged surface electrical connections have been provided between the outer surface of the connector module 20 and the PCB 22 and through-hole soldering used to join the components. Cover 24 is then secured to the housing 14 to retain PCB 22 in electrical contact with the connector module 20, preferentially in a water-tight condition. The electronic data recorder can then be secured via feet 40 to an automotive vehicle surface and a wire harness connector inserted into the connector module 20.

The exemplary embodiment has been described with reference to the preferred embodiments. Obviously, modifications and alterations will occur to others upon reading and understanding the preceding detailed description. It is intended that the exemplary embodiment be construed as including all such modifications and alterations insofar as they come within the scope of the appended claims or the equivalents thereof.

The invention claimed is:

1. An automotive vehicle including an electronic data storage device and an enclosure for protecting said device, said enclosure comprising a first wall and a sidewall having a first end engaging said first wall and in cooperation with said first wall forming a cavity configured to receive said electronic data storage device, a cover configured to matingly engage a second end of said sidewall and seal at least one side of said cavity, a mounting wall having a first region extending radially from said first end of said sidewall and a second region extending from the first region at least substantially perpendicular to said first region, and wherein said second region is spaced from and faces said sidewall, a gap being formed between said sidewall and said second region of the mounting wall, said gap being continuous around at least one side of said enclosure, and said gap being closed on at least one side by said cover, said mounting wall including at least two feet located distally to a point of engagement with said sidewall, said feet adapted to engage said vehicle.

2. The automotive vehicle of claim 1, wherein said electronic data storage device comprises a printed circuit board including semiconductor elements suited for data storage.

3. The automotive vehicle of claim 1, wherein said electronic data storage device comprises a conductive foil including magnetic elements suited for data storage.

4. The automotive vehicle of claim 1, wherein said cover is dimensioned to overlap said sidewall.

5. The automotive vehicle of claim 1, wherein said enclosure, said at least two feet, includes at least three feet.

6. The automotive vehicle of claim 5, wherein said feet extend angularly from said mounting wall.

7. The automotive vehicle of claim 1, wherein said feet extend below said cover.

8. The automotive vehicle of claim 1, wherein said first wall, said sidewall, and said mounting wall are comprised of an integrally molded body.

9. The automotive vehicle of claim 1, wherein said mounting wall is discontinuous.

10. The automotive vehicle of claim 8, wherein said integrally molded body is comprised of an alloy.

11. The automotive vehicle of claim 8, further comprising integrally molded posts extending from said sidewall for receiving said cover.

12. A method for enclosing and protecting an electronic data storage device, said method comprising:
providing an enclosure comprised of a main housing and a mounting wall, said main housing comprising a first wall and a sidewall having a first end engaging said first wall and in cooperation with said first wall forming a cavity configured to receive said electronic data storage device, said mounting wall extending from said first end of said sidewall to form a generally "U" shaped channel between said sidewall and said mounting wall, said mounting wall including at least one foot adapted for attachment to a surface;
inserting a connector module into said cavity;
arranging said electronic data storage device within said cavity in electrical communication with said connector module;
securing a cover to said main housing to retain said electronic data storage device and to close at least one side of said gap; and
attaching said enclosure to a surface and inserting a wiring harness connector, wherein an impact force upon said enclosure preferentially fractures one or both of said mounting wall and said foot as opposed to said main housing.

13. The method of claim 12, wherein said surface comprises a surface of an automotive vehicle.

14. An enclosure for protecting an electronic data storage device, said enclosure comprising:
a housing including:
a top wall;
a sidewall extending from an edge of said top wall, said top wall and said sidewall forming a cavity configured to receive said electronic data storage device;
a mounting wall including:
a first portion extending outwardly from the edge and generally coplanar to said top wall; and
a second portion extending generally downwardly from said first portion at least generally parallel to said sidewall, said second portion extending below said sidewall and including a foot extending at least generally perpendicular to said second portion; and
said sidewall and said second portion of the mounting wall residing in non-overlapping planes to define a gap between said sidewall and said mounting wall;
a cover configured to mate with said housing, to seal at least one side of said cavity.

15. The enclosure of claim 14, wherein said cover is secured to said sidewall.

16. The enclosure of claim 14, wherein a gap exists between said sidewall and said mounting wall.

17. The enclosure of claim 14, wherein said mounting wall engages said housing adjacent the edge of said top wall.

18. An enclosure for protecting an electronic data storage device, the enclosure comprising:
a housing including:
a top wall;
an inner wall extending from the top wall in a generally perpendicular direction to the top wall to form a cavity, the cavity configured to receive the electronic data storage device;
an outer wall extending from the top wall in a generally perpendicular direction to the top wall, said outer wall surrounding the inner wall and forming a channel having a closed end defined by the top wall, and sides defined by the inner wall and the outer wall which faces the inner wall, the channel disposed on opposing sides of the cavity;
a cover configured to mate with the housing to seal at least one side of each of the cavity and the channel.

19. The automotive vehicle of claim 1, wherein said gap comprises a channel having a closed end defined by said first region of the mounting wall and sides defined by the second region of the mounting wall and the sidewall.

20. The automotive vehicle of claim 19, wherein said channel is at least substantially "U" shaped in cross section.

21. The automotive vehicle of claim 1, wherein said second region of the mounting wall is thicker than the sidewall.

* * * * *